United States Patent Office 3,787,558
Patented Jan. 22, 1974

3,787,558
MAGNESIUM HYDROXIDE PRODUCTION
Charles Clifford Briggs, North Anston, and Trevor Wilkinson Lythe, Worksop, England, assignors to Steetley (Mfg.) Ltd., Nottinghamshire, England
No Drawing. Filed Oct. 14, 1970, Ser. No. 80,758
Claims priority, application Great Britain, Oct. 17, 1969, 51,019/69
Int. Cl. C08f 5/22
U.S. Cl. 423—164                                 9 Claims

ABSTRACT OF THE DISCLOSURE

A process for producing magnesium hydroxide having a low boron content from brines or sea water comprising the steps of precipitating magnesium hydroxide from the brine or sea water with alkali and subsequently washing the precipitated magnesium hydroxide with aqueous alkali. The precipitation of the magnesium hydroxide may be carried out in two stages.

---

The present invention relates to a process for producing magnesium hydroxide having a low boron content from brines such as bitterns or sea water.

On a commercial scale magnesium hydroxide is precipitated from sea water by treating the sea water with alkali, usually hydrated lime or hydrated dolime (Dolime is calcined dolomite and has the chemical formula CaO.MgO). If the precipitation of the magnesium hydroxide is carried out by the straightforward addition to sea water of a stoichiometric quantity, or less than a stoichiometric quantity, of the hydrated lime or dolime, it is found that the precipitated magnesium hydroxide is contaminated with quantities of boron which reduce the effectiveness of the magnesium hydroxide for many purposes such as the subsequent manufacture of high purity refractory bricks.

Surprisingly, it has now been found that magnesium hydroxide having a substantially reduced boron content is obtained if, subsequent to the precipitation of the magnesium hydroxide with alkali, the precipitated magnesium hydroxide is washed with a further quantity of aqueous alkali. It is observed in practice that some reduction in boron content occurs merely upon precipitating magnesium hydroxide under initial conditions of relatively high pH, but the boron content is even further reduced after washing with aqueous alkali.

Accordingly the present invention provides a process for producing magnesium hydroxide having a low boron content from brines or sea water which process comprises treating brine or sea water with alkali to precipitate magnesium hydroxide and subsequently washing the precipitated magnesium hydroxide with aqueous alkali.

Preferably in the treatment of the brine or sea water with alkali, the brine or sea water is added to the alkali with the result that the magnesium hydroxide is largely precipitated at a pH greater than that at equivalence. Furthermore the amount of aqueous alkali used to precipitate the magnesium hydroxide from the brine or sea water is preferably up to about 5% by weight in excess of the stoichiometric weight necessary to precipitate all of the magnesium ions as magnesium hydroxide.

More particularly, the precipitation of the magnesium hydroxide from the brine or sea water according to the process of the invention may be effected in two stages by:

(a) mixing, in an alkaline medium, brine or sea water with an amount of alkali in excess of the stoichiometric amount necessary to precipitate all of the magnesium ions in the brine or sea water as magnesium hydroxide, and thereafter, (b) mixing fresh brine or sea water in a single stage or in two or more sub-stages, separate quantities of fresh brine or sea water being added at each sub-stage, with the alkaline suspension produced in stage (a) containing the precipitated magnesium hydroxide to precipitate further quantities of magnesium hydroxide. The alkali used for precipitating the magnesium hydroxide in the above process may for example be calcium or sodium hydroxide.

Desirably the amount of alkali used in stage (a) is from 10% to 60% by weight, preferably from 15% to 45% by weight, in excess of the stoichiometric weight necessary to precipitate all of the magnesium ions as magnesium hydroxide.

In stage (b) the amount of sea water which is mixed with the alkali suspension containing magnesium hydroxide resulting from stage (a) is desirably such as to provide within ±5% by weight of the stoichiometric weight of magnesium ions necessary to react with the excess alkali present in the suspension containing magnesium hydroxide resulting from stage (a). However stage (b) may be operated outside this range if a less economic process or a magnesium hydroxide having a higher boron content can be tolerated.

Stage (b) may in fact comprise a number of sub-stages, for example from 2 to 4 sub-stages, separate quantities of fresh sea water being added at each sub-stage. However it is preferred that at the end of final sub-stage the total amount of sea water which has been added gives within ±5% by weight of the stoichiometric weight of magnesium ions necessary to react with the alkali present in the suspension containing magnesium hydroxide. Preferably stage (b) is operated as a single stage or as two sub-stages. If two sub-stages are used preferably about 40% to 70% of the sea water which is to be added during stage (b) is added at the first of the two sub-stages.

The aqueous alkali used in the washing step of the present invention may suitably be an aqueous solution of sodium hydroxide or of calcium hydroxide. In practice the washing step is preferably carried out after separating the magnesium hydroxide precipitate from a large part of the spent sea water in which the magnesium hydroxide is suspended, the separation being accomplished by, for example, settling or centrifugal means. Desirably the degree of separation is such as to yield a suspension containing 25–300 grams of magnesium hydroxide per litre of suspension.

The washing operation is preferably carried out by agitating the magnesium hydroxide in admixture with the aqueous alkali in a suitable vessel, for example a wash tank.

Desirably the magnesium hydroxide content of the suspension during washing is 2–100 grams per litre. The pH of the suspension during washing with alkali is preferably between 11.5 and 13.

If an aqueous solution of lime or sodium hydroxide is used during the washing step the liquors therefor may be used as, or part of, the alkali used at the beginning of the process to precipitate the magnesium hydroxide.

The product obtained after washing with aqueous alkali will of course be contaminated with alkali, thus it is preferable that after the alkali wash, the product is subsequently washed with water. The water wash liquor may then desirably be used in making up the alkali used at the beginning of the process to precipitate magnesium hydroxide.

After washing, the magnesium hydroxide is preferably recovered by filtration, the filtrate liquors being returned for use in the washing step.

The properties of the magnesium hydroxide in respect of settling rate, filterability and density are improved if the precipitation occurs at low concentrations of reactants and at high concentrations of precipitated magnesium hydroxide. These conditions may be obtained in the present process by mixing part of the alkali washed magnesium hydroxide suspension resulting from the washing stage of the process with the alkali, or part of the alkali, which is to be used at the beginning of the process before it is so used. Desirably before this mixture of magnesium hydroxide suspension and alkali is used to precipitate further magnesium hydroxide at the beginning of the process a period of time sufficiently long to extract some of the boron in the magnesium hydroxide into the alkali is allowed to elapse. As an alternative procedure when using the two stage precipitation method part of the magnesium hydroxide suspension obtained in stage (b) may be returned for use in stage (a). Preferably the amount of magnesium hydroxide suspension by weight which is recycled to the start of the process to the amount by weight which is retained and from which product material is eventually recovered is in the range 1:1 to 30:1.

In one method of operating the process of the present invention a turbulent pipe reactor is used. The turbulent pipe reactor comprises a pipe provided with a plurality of inlets and an outlet, alkali or a mixture of alkali and recycle magnesium hydroxide being fed through the inlet most remote from the outlet and sea water being fed through the remaining inlets, the distance between the sea water inlets being such as to allow sufficient time at the rate of flow of materials in the pipe for substantially all the magnesium ions in one batch of sea water to be precipitated as magnesium hydroxide before the next batch of sea water is added.

In a modification of the process of the present invention, use is made of the affinity for boron which magnesium hydroxide possesses and to this end at least part of the sea water which is used in the present process is first contacted with magnesium hydroxide whereby the boron in the sea water is adsorbed on the magnesium hydroxide thus effecting a substantial reduction in the concentration of boron in the sea water. The magnesium hydroxide which is used to strip boron from sea water may be part of the magnesium hydroxide which has been alkali washed or it may be a quantity of magnesium hydroxide which, after being used for stripping, is alkali washed to remove boron and then returned to perform a further stripping operation on fresh sea water. When employing the two stage precipitation procedure, if only part of the sea water is to be stripped of boron by magnesium hydroxide, this part is suitably that sea water which is employed in stage (b) and which is mixed with the alkaline suspension containing magnesium hydroxide obtained in stage (a) of the precipitation. The boron in the magnesium hydroxide which has been used for stripping boron from sea water is easily removed, at least to a large extent, by washing, preferably with alkali.

The magnesium hydroxide obtained in the present process may be calcined to give an active magnesia suitable for a variety of purposes such as for fillers and as an intermediate for making magnesium salts. The calcined material may also be pelletised and dead-burned or just dead-burned to give a high purity dead-burned magnesia suitable for use in the manufacture of refractory shapes. It will be understood that the present invention extends in scope to a magnesium hydroxide when obtained by the process of the present invention and also to such products as are mentioned above which are obtained therefrom.

The following non-limitative examples, in which parts are by weight, are given to illustrate the process of the present invention.

EXAMPLE 1

Into a first reaction tank was fed slurried dolime and sea water in such proportions as to give a 25% by weight excess of alkali over the stoichiometric requirement to precipitate the magnesium content of the sea water as magnesium hydroxide. Recycle material containing precipitated magnesium hydroxide was also fed into this reaction tank. The pH of the material in the first reaction tank was about 12.2. On analysis it was found that the magnesium hydroxide in the tank contained 0.04 part of $B_2O_3$ per 100 parts of MgO. The recycle magnesium hydroxide contained 0.05 part of $B_2O_3$ per 100 parts of MgO.

The material from the first reaction tank was fed into a second reaction tank together with further quantities of sea water such that the excess alkali in the material from the first reaction tank was used to precipitate all the magnesium ions in the added sea water as magnesium hydroxide. The pH in the second tank was about 10.8 and the magnesium hydroxide in the tank obtained 0.19 part of $B_2O_3$ per 100 parts of MgO.

The material from the second reaction tank was passed to a settling tank from which was obtained a slurry having a solids content of 130 parts MgO per liter. The slurry was mixed with sodium hydroxide solution in a wash tank the solids content in the wash tank being 25 parts MgO per liter and the pH being 13.0. 20% by weight of the washed slurry was filtered and the remainder was used to make up the recycle material which was fed to the first vessel. The filtered magnesium hydroxide after washing with water on the filter was found to contain only 0.05 part of $B_2O_3$ per 100 parts of MgO.

EXAMPLE 2

Sea water was fed into an agitated reaction vessel through a perforated pipe extending down into the vessel while an equivalent amount of hydrated lime was fed through a different pipe having only one opening at its lower extremity. In this way the sea water was effectively added incrementally to the alkali thereby ensuring that the magnesium hydroxide was precipitated for the most part at a pH greater than that at equivalence. The magnesium hydroxide slurry which was obtained was passed to a settling tank where the magnesium hydroxide was separated from the bulk of the spent sea water. The magnesium hydroxide was washed by slurrying with aqueous caustic soda to give a slurry containing 5 grams/liter MgO at pH 12.0. Before washing with alkali the magnesium hydroxide contained 0.22% by weight of $B_2O_3$ while after washing it contained only 0.13% $B_2O_3$.

EXAMPLE 3

The process of Example 2 was repeated using caustic soda to precipitate the magnesium hydroxide. Before washing with alkali the magnesium hydroxide contained 0.35% by weight of $B_2O_3$ while after washing it contained only 0.08% by weight $B_2O_3$.

EXAMPLE 4

Sea water was mixed with hydrated dolime at the rate of about 4.7 pounds of dolomitic oxides per 100 gallons of sea water in a stirred vessel. The hydroxide was introduced into the vessel by means of a vertically disposed pipe while the sea water was introduced tangentially at the side of the vessel near the top. A pipe from the reaction vessel transferred magnesium hydroxide slurry to the settling tank where magnesium hydroxide was separated from the larger bulk of spent sea water. This magnesium hydroxide contained 0.17% by weight of $B_2O_3$ and, on slurrying with aqueous sodium hydroxide to give a slurry containing 5 grams per liter of MgO at a pH of 12.0, a magnesium hydroxide was obtained after 3 hours containing 0.13% $B_2O_3$. This magnesium hydroxide was subsequently washed with water to remove Na and other contaminating ions.

The wash liquor from the sodium hydroxide wash was mixed with the slaked dolime.

EXAMPLE 5

The process of Example 4 was repeated but this time using caustic soda in place of slaked dolime. Before washing the magnesium hydroxide contained 0.34% $B_2O_3$ while after washing it contained 0.18% $B_2O_3$.

EXAMPLE 6

The process of Example 2 was repeated but this time using 3% in excess of equivalence of lime. The boron content of the precipitated magnesium hydroxide after washing with alkali was 0.10%. Moreover upon further washing with water filtering and calcining at 900° C. and then pelletising and dead burning the density of the MgO was 3.38 compared with a density of 3.33 obtained from the magnesia of Example 2.

We claim:

1. A process for producing magnesium hydroxide having a low boron content from saline solutions which process comprises treating a saline solution containing magnesium selected from the group consisting of brine and sea water with aqueous alkali to precipitate magnesium hydroxide, the precipitation of the magnesium hydroxide from the saline solution being effected in stages by: (a) mixing saline solution with an amount of alkali which is from about 10% to 60% by weight in excess of the stoichiometric amount necessary to precipitate all of the magnesium ions in the saline solution as magnesium hydroxide, and thereafter, (b) mixing fresh saline solution in at least one additional stage with the alkali suspension containing the precipitated magnesium hydroxide produced in (a) to precipitate magnesium hydroxide from the fresh saline solution, separate quantities of fresh saline being added at each such additional stage, the total amount of fresh saline solution which is added during (b) being such as to provide with ±5% by weight of the stoichiometric weight of magnesium ions necessary to react with the excess alkali present in the suspension containing magnesium hydroxide resulting from (a), separating spent saline solution from the precipitated magnesium hydroxide to yield a concentrated suspension containing from 25 to 300 grams of magnesium hydroxide per liter of suspension, adding aqueous alkali to said concentrated suspension, washing the precipitated magnesium hydroxide in said concentrated suspension with the added aqueous alkali, and thereafter separating washed magnesium hydroxide from said concentrated suspension.

2. A process as claimed in claim 1 wherein part of the concentrated magnesium hydroxide suspension to which aqueous alkali has been added is recycled from the washing operation and mixed with the alkali used to precipitate the magnesium hydroxide from the saline solution.

3. A process as claimed in claim 1 wherein, prior to the precipitation of the magnesium hydroxide from the saline solution, at least part of said saline solution is contacted with magnesium hydroxide.

4. A process as claimed in claim 1 wherein the magnesium hydroxide content of the concentrated suspension after the addition of the aqueous alkali is from 2 to 100 grams per liter.

5. A process as claimed in claim 1 wherein the pH of the suspension during washing with aqueous alkali is from 11.5 to 13.

6. A process as claimed in claim 1 wherein the alkali used for washing the precipitated magnesium hydroxide is selected from the group consisting of calcium hydroxide and sodium hydroxide.

7. A process as claimed in claim 1 wherein the precipitated magnesium hydroxide, after being washed with aqueous alkali, is subsequently washed with water to remove any remaining alkali.

8. A process as claimed in claim 1 wherein the alkali used to precipitate magnesium hydroxide is selected from the group consisting of calcium hydroxide and sodium hydroxide.

9. A process as claimed in claim 1 wherein:
   (i) part of the concentrated magnesium hydroxide suspension to which aqueous alkali has been added is recycled from the washing operation and mixed with the alkali used to precipitate the magnesium hydroxide from the saline solution.
   (ii) the magnesium hydroxide content of the concentrated suspension after the addition of the aqueous alkali is from 2 to 100 grams per liter of suspension, and
   (iii) the pH of the suspension during washing with aqueous alkali is from 11.5 to 13.

References Cited

UNITED STATES PATENTS

| | | | |
|---|---|---|---|
| 2,893,840 | 7/1959 | Vettel et al. | 423—164 X |
| 3,080,215 | 3/1963 | Waldron et al. | 423—164 X |
| 3,425,804 | 2/1969 | Rastrelli | 423—164 |
| 2,405,055 | 7/1946 | Robinson et al. | 23—201 |
| 2,703,748 | 3/1955 | Clarke et al. | 23—201 |

EDWARD J. MEROS, Primary Examiner

U.S. Cl. X.R.

423—636